United States Patent
Subbiah (12)

(10) Patent No.: US 12,321,720 B2
(45) Date of Patent: Jun. 3, 2025

(54) SYSTEM AND METHOD FOR TASK-BASED ESTIMATION AND PLANNING OF APPLICATION DEVELOPMENT PROJECTS AND RESOURCES

(71) Applicant: Edward D. Jones & Co., L.P., St. Louis, MO (US)

(72) Inventor: Chidambaram Subbiah, St. Louis, MO (US)

( * ) Notice: Subject to any disclaimer, the term of this patent is extended or adjusted under 35 U.S.C. 154(b) by 0 days.

(21) Appl. No.: 16/704,903

(22) Filed: Dec. 5, 2019

(65) Prior Publication Data

US 2020/0183653 A1     Jun. 11, 2020

Related U.S. Application Data

(60) Provisional application No. 62/775,674, filed on Dec. 5, 2018.

(51) Int. Cl.
*G06F 8/20*      (2018.01)
*G06F 8/70*      (2018.01)
*G06F 11/34*     (2006.01)

(52) U.S. Cl.
CPC .............. *G06F 8/20* (2013.01); *G06F 8/70* (2013.01); *G06F 11/3447* (2013.01)

(58) Field of Classification Search
None
See application file for complete search history.

(56) References Cited

U.S. PATENT DOCUMENTS

| | | | |
|---|---|---|---|
| 7,890,924 B2 * | 2/2011 | Raffo | G06Q 10/06 717/105 |
| 10,885,440 B2 * | 1/2021 | Boyer | G06F 30/20 |
| 2014/0136270 A1 * | 5/2014 | Switick | G06Q 10/06 705/7.23 |
| 2019/0318295 A1 * | 10/2019 | Srivastava | G06N 20/00 |

* cited by examiner

*Primary Examiner* — Lewis A Bullock, Jr.
*Assistant Examiner* — Mark A Gooray

(57) ABSTRACT

System and methods are disclosed for a task-based approach to the generation of a project estimation. The systems and method described herein generate design patterns associated with a software development project based on historical information at a task level. Validate the design patterns. Decompose the design patterns into scenarios having a plurality of tasks. Survey the scenarios. Develop a plurality of estimate baselines based on past actual estimates and survey information. Develop an estimation model based on the plurality of estimate baselines; and provide feedback to the historical information of the estimation model based on actual task based performance metrics for use in generating design patterns for future projects.

20 Claims, 9 Drawing Sheets

| Totals from Cost Projection Tab (Includes Overide Values and Overhead Labor) | | | | Recommended Values | |
|---|---|---|---|---|---|
| Activity | Hours | Cost | % | Hours | Cost |
| Project Planning | 1,304 | $65,200.00 | 14% | 1,000 | $50,000.00 |
| Design | 601 | $30,050.00 | 6% | 599 | $29,925.00 |
| Development/Configuration | 5,200 | $260,000.00 | 54% | 5,899 | $294,950.00 |
| Verification | 1,384 | $69,200.00 | 14% | 1,539 | $76,937.50 |
| Implementation | 839 | $41,960.00 | 9% | 833 | $41,655.00 |
| Post Implementation | 330 | $16,480.00 | 3% | 337 | $16,827.50 |
| Totals Labor | 9,658 | 482,890.00 | 100% | 10,206 | 510,295.00 |

FIG. 5

| EDJ SME/PL Estimate | Recommended Cost | EDJ Predictive Cost | EJ Function Point Baseline | COCOMO II Best Case | COCOMO II Average | COCOMO II Costlier |
|---|---|---|---|---|---|---|
| $431,000 | $441,110 | $375,463 | $276,700 | $246,858 | $297,419 | $339,057 |

SYSTEM AND METHOD FOR TASK-BASED ESTIMATION AND PLANNING OF APPLICATION DEVELOPMENT PROJECTS AND RESOURCES

The present application claims the priority of U.S. Provisional Application No. 62/775,674 filed Dec. 5, 2018, the disclosure of which is incorporated herein by reference.

FIELD

The present disclosure generally relates to the technical field of software development and information technology estimation. More specifically, the present disclosure is directed to systems and methods of improving estimation performance by using design patterns that meet the needs of a local context and combining expert estimation in the context of a standardized design as a way to identify core design patterns and the tasks that form the basis for the design patterns.

BACKGROUND

According to Murali K. Chemuturi in his book "Software Estimation Best Practices, Tools & Techniques: A Complete Guide for Software Project Estimators" 2009, software development estimation incorporates various factors such as an estimation of software size, software development effort and costs, and software development schedule for a specified software project in a specified environment, using defined methods, tools and techniques. Historically, project estimation is measured in persons per day or persons per hours with the goal of optimizing the resources available during the estimation process.

Software cost estimation is a complex and difficult task crucial to many organizations because accurately predicting development effort invariably depends on the context and use for a particular organization. Moreover, organizations incur sizeable additional expenses when estimation is inaccurate due to cost and effort overruns.

Traditional methods of software development include various computer implemented methodologies. Specifically, a traditional method referred to as the Waterfall methodology includes determining how a development project moves from one stage to another in a downward direction at the completion of each step. Traditional models fail to consider the local context, which is often the driver of costs in a software development effort. Specifically, the local context may be referred to as the associated task local to an organization or business case that may vary across industries. In other words, the same task performed for different industries may result in a different cost estimate across the different industries. For example, the relationship between a development effort and the cost can differ greatly from context to context, but the prior art estimation systems do not consider the local context of the tasks. Thus, there is a need to develop a task based estimating model that is based on unique design patterns based on local contexts used by an organization.

A design pattern is a generic solution to a commonly occurring issue in software design and development. Design patterns are useful in that they can speed up the development process in that a solution is often implemented the same way and design patterns yield themselves to be reused. Design patterns typically become a language in which experts in software development field communicate. Typical prior art estimate systems rely on reusable standardized design patterns. One problem associated with the heavy reliance on reusable standard design patterns is that it obscures the tasks that form the basis of the design pattern.

Design patterns are useful in that they speed up the development process, such that a solution is often implemented in the future the same way and previously developed design patterns are reusable. Organizations often rely on expert estimates and those estimates are often from subject matter experts who have worked in those systems for a long time. Some organizations standardize on technology design patterns and all application development teams use the same technology stack and design patterns for most application development. This lends itself to bottom up estimating that is rooted at the task level. These prior art estimating systems fail to uncover the underlying unique design pattern of the organization and the tasks that form the basis of that core unique design pattern, and thus result in a generic cost estimate not tailored to the local context of the task.

Thus, there remains a persistent need to incorporate design patterns specific to an organization based on task. The present disclosure is directed to analyzing historical data to generate a set of design patterns for an organization, and then decomposing each design pattern to set of tasks or scenarios. By using tasks specific to an organization and incorporating information associated with the tasks into the design patterns, organizations can improve estimation associated with application development and information system implementation.

The present disclosure identifies technological advances for finding the underlying design pattern of the organizations and decomposing the design pattern into tasks, based on information associated with context/business. Baselines are identified for creating a bottom-up estimating model. Moreover, the estimation system continuously improves estimation at the task level, after deployed monitoring and data collection from actual projects, enters the execution phase post estimate. In addition, the estimation system identifies total labor hours for a project and the explanatory facts that contribute to overall labor costs. Traditionally, a project is composed of two types of resources; employees and temporary labor in the form of contractors. Additionally, experience of resources is an important factor to be considered in estimation. In various embodiments, the estimation system and method incorporates economic impact of resources and other factors on overall labor cost by predicting labor costs accounting for various models. In some embodiments, the estimation system and method will incorporate a task based information model and a predictive model based on historical function point counts to permit executive judgment in determining a final estimate for a project.

The present disclosure will also have other features to enhance the usability of the tool, and these features will cater to the local environment of a company. By way of example, these features will include the ability to breakdown the estimate into smaller chunks by functionality, requirements, etc. The present disclosure will also have the capability to override the baseline at the task level. The estimating tool will then show the estimate from the subject matter expert with the override and compare it with the recommended cost from the tool without the overrides.

The present disclosure applies to both predictive and prescriptive analytics in order to: (1) develop a new estimating tool that will produce a suite of estimates; and (2) develop a new optimization modeling framework for better planning and resource utilization in agile project environment. Furthermore, the estimating system will be rooted in the local environment of the company and will be based on reusing design patterns. The tool will provide estimates for these scenarios while at the same time giving the subject matter expert the capability to override an estimate by providing a reason, when deemed appropriate. The optimization modeling framework will set the foundation for making better scheduling decisions as it will consider the skill and domain expertise of resources while assigning them work on a project.

SUMMARY

According to various embodiments, a non-transitory computer readable medium having computer-executable instructions embodied thereon is disclosed. When executed by a processor, the computer-executable instructions cause the processor to generate design patterns associated with a software development project based on historical information at a task level; validate the design patterns; decompose the design patterns into scenarios having a plurality of tasks; survey the scenarios; develop a plurality of estimate baselines based on past actual estimates and survey information; develop an estimation model based on the plurality of estimate baselines; and provide feedback to the historical information of the estimation model based on actual task based performance metrics for use in generating design patterns for future projects.

In various embodiments, a method is disclosed. The method includes the steps of generating design patterns associated with a software development project based on historical information at a task level; validating the design patterns; decomposing the generated design patterns into scenarios having a plurality of tasks; surveying the scenarios; developing a plurality of estimate baselines based on past actual estimates and survey information; developing an estimation model based on the plurality of estimate baselines; and, providing feedback to the historical information of the estimation model based on actual task based performance metrics for use in generating design patterns for future projects.

In various embodiments, a system comprising a server is provided. The server is configured to communicatively couple to a plurality of client devices that are accessible by a user to enable the user to communicate with the server; receive a request to generate a software project estimate; generate design patterns associated with the software project based on historical information at a task level; validate the design patterns; decompose the design patterns into scenarios having a plurality of tasks; receive survey information associated with the scenarios; develop a plurality of estimate baselines based on past actual estimates and survey information; generate an estimation model based on the plurality of estimate baselines; and, provide feedback to the historical information of the estimation model based on actual task based performance metrics for use in generating design patterns for future projects.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, in which:

FIG. 5 is an illustration of the overall cost for a project in accordance with some embodiments of the present disclosure.

FIG. 6 is an example of an estimate comparative tab in accordance with some embodiments of the present invention.

FIG. 7 is an example of an estimate comparison tab in accordance with some embodiments of the present invention.

FIG. 8 is an example of a design and development task window entered by the subject matter expert in accordance with some embodiments of the present invention.

DETAILED DESCRIPTION

Figure 1A:
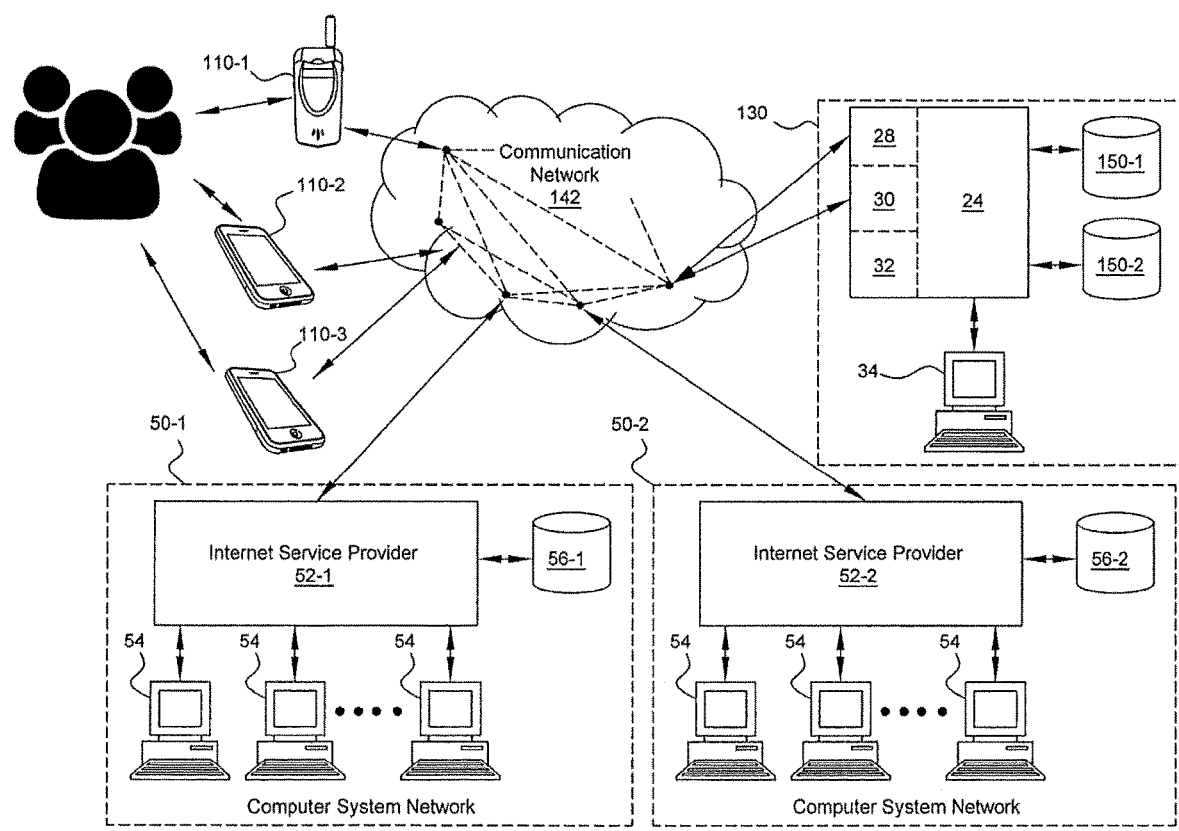
FIG. 1A illustrates one example of a system in accordance with some embodiments of the present disclosure.

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise A comprehensive estimation system and method are provided in the present disclosure. As discussed throughout this specification, the estimation system and methods advantageously improve estimation of software development processes using design patterns based on information related to tasks and assessments. Estimation is improved by incorporating disparate internal and external data sources together to analyze, clean and aggregate data to develop new software cost estimating models for traditional (waterfall), new (agile) and hybrid techniques of managing projects. The system and method advantageously improve estimation by updating and developing project life cycles rooted in design patterns based on tasks. Furthermore, the system and method described herein, incorporate task level estimates into the design patterns to continuously update the estimation model in order to adjust baselines and increase efficiency. In various embodiments the estimation system and method generate labor hours or similar project estimation metrics for a project and identify explanatory factors that contribute to the overall labor costs. By way of example, explanatory factors may include but are not limited to software size, software development effort, software development costs, and software development schedule for a specified environment. In various embodiments, external environmental factors that affect performance such as stress and time to deadline are also incorporated in the estimation model.

In various embodiments, the estimation tool incorporates a specific organization's local context based on task-based implementation. As will be explained in further detail throughout this disclosure, the estimation system and method analyzes various estimation models and provides a comparison for the accuracy of associated models based on historical data and scaling factors. Furthermore, the system and method describe herein, monitor the efficiency of actual task with respect to the estimation, update the estimation model and intelligently improve the matching results over time. In some embodiments, a machine learning algorithm incorporates actual project efficiency for tasks into the system to optimize estimation and update design patterns.

System Overview

In various embodiments, the estimation system may interact with client devices for information exchange. FIG. 1A depicts one example of a system 100 in which a plurality of client devices 110-1, 110-2, and 110-3 (collectively "client devices 110") are connected via communication network 142 to one or more computer system networks 50-1, 50-2 ("computer networks 50"), and to management server 130. Communication network 142 may be a wide area network ("WAN"), a local area network ("LAN"), personal area network ("PAN"), or the like. In one embodiment, communication network 142 is the Internet and client devices 110 are online. "Online" may mean connecting to or accessing source data or information from a location remote from other devices or networks coupled to communication network 142.

Management server 130 includes a processing unit 24 coupled to one or more data storage units 150-1, 150-2 (collectively referred to as "database management system 150" or "DBMS 150"). The processing unit 24, in some embodiments is configured to provide front-end graphical user interfaces ("GUI") (e. financial advisor GUI 28 and client users GUI 30), and a back-end or administrative graphical user interface or portal 32 to one or more remote computers 54 or to one or more local computers 34. In some embodiments, a estimation interface (not shown) is provided that accesses management server 130 via GUI 28. The GUIs can take the form of, for example, a webpage that is displayed using a browser program local to remote computers 54 or to one or more local computers 34. It is understood that the system 100 may be implemented on one or more computers, servers, or other computing devices. In some embodiments, the GUI may be displayed on client devices 110 via a software application. For example, system 100 may include additional servers programmed or partitioned based on permitted access to data stored in DBMS 150. As used herein, "portal" is not limited to general-purpose Internet portals, such as YAHOO! or GOOGLE but also includes GUIs that are of interest to specific, limited audiences and that provide the party access to a plurality of different kinds of related or unrelated information, links and tools as described below. "Webpage" and "website" may be used interchangeably herein.

Remote computers 54 may be part of a computer system network 50-1, 50-2 and gain access to communication network 142 through an Internet service provider ("ISP") 52-1, 52-2 ("ISPs 52"). Client devices 110 may gain access to communications network 142 through a wireless cellular communication network, a WAN hotspot, or through a wired or wireless connection with a computer as will be understood by one skilled in the art. Financial advisors, client users and supervisory personnel, as will be described below, may use remote computers 54 and/or client devices 110 to gain access to system 100.

In one embodiment, client devices 110 includes any mobile device capable of transmitting and receiving wireless signals. Examples of mobile instruments include, but are not limited to, mobile or cellular phones, smart phones, personal digital assistants ("PDAs"), laptop computers, tablet computers, music players, and e-readers, to name a few possible devices.

Figure 1B:
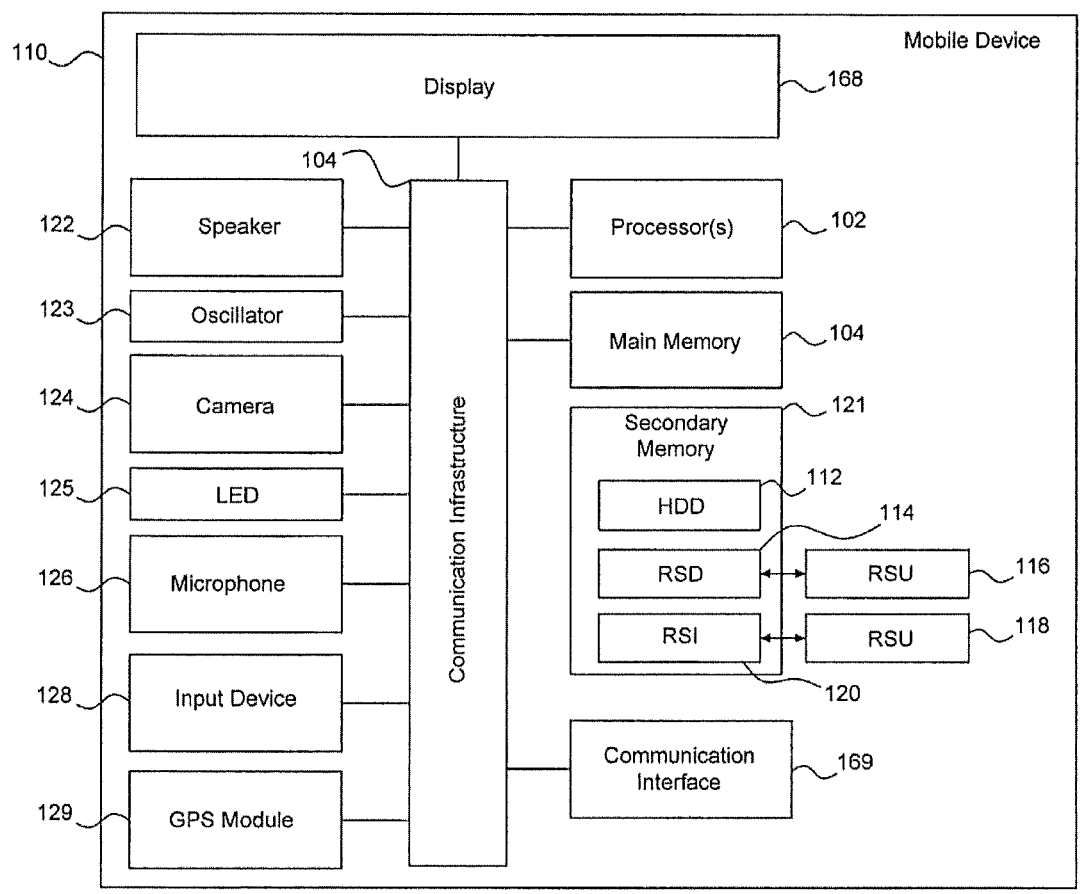
FIG. 1B illustrates one example of an architecture of a mobile device in accordance with some embodiments of the present disclosure.

FIG. 1B is a block diagram of one example of an architecture of client device 110. As shown in FIG. 1B, client device 110 includes one or more processors, such as processor(s) 102. Processor(s) 102 may be any central processing unit ("CPU"), microprocessor, micro-controller, or computational device or circuit for executing instructions. Processor(s) are connected to a communication infrastructure 104 (e.g., a communications bus, cross-over bar, or network). Various software embodiments are described in terms of this exemplary client device 110. After reading this description, it will be apparent to one of ordinary skill in the art how to implement the method using client devices 110 that include other systems or architectures. One of ordinary skill in the art will understand that computers 34, 54 may have a similar and/or identical architecture as that of client devices 110. Put another way, computers 34, 54 can include some, all, or additional functional components as those of the client device 110 illustrated in FIG. 1B.

Client device 110 includes a display 168 that displays graphics, video, text, and other data received from the communication infrastructure 104 (or from a frame buffer not shown) to a user (e.g., a subscriber, commercial user, back-end user, or other user). Examples of such displays 168 include, but are not limited to, LCD screens, OLED display, capacitive touch screen, and a plasma display, to list only a few possible displays. Client device 110 also includes a main memory 108, such as a random access ("RAM") memory, and may also include a secondary memory 110. Secondary memory 110 may include a more persistent memory such as, for example, a hard disk drive ("HDD") 112 and/or removable storage drive ("RSD") 114, representing a magnetic tape drive, an optical disk drive, solid state drive ("SSD"), or the like. In some embodiments, removable storage drive 114 reads from and/or writes to a removable storage unit ("RSU") 116 in a manner that is understood by one of ordinary skill in the art. Removable storage unit 116 represents a magnetic tape, optical disk, or the like, which may be read by and written to by removable storage drive 114. As will be understood by one of ordinary skill in the art, the removable storage unit 116 may include a tangible and non-transient machine readable storage medium having stored therein computer software and/or data.

In some embodiments, secondary memory 110 may include other devices for allowing computer programs or other instructions to be loaded into client device 110. Such devices may include, for example, a removable storage unit ("RSU") 118 and a corresponding interface ("RSI") 120. Examples of such units 118 and interfaces 120 may include a removable memory chip (such as an erasable programmable read only memory ("EPROM")), programmable read only memory ("PROM")), secure digital ("SD") card and associated socket, and other removable storage units 118 and interfaces 120, which allow software and data to be transferred from the removable storage unit 118 to client device 110.

Client device 110 may also include a speaker 122, an oscillator 123, a camera 124, a light emitting diode ("LED") 125, a microphone 126, an input device 128, and a global positioning system ("GPS") module 129. Examples of input device 128 include, but are not limited to, a keyboard, buttons, a trackball, or any other interface or device through a user may input data. In some embodiment, input device 128 and display 168 are integrated into the same device. For example, display 168 and input device 128 may be touch-screen through which a user uses a finger, pen, and/or stylus to input data into client device 110.

Client device 110 also includes one or more communication interfaces 169, which allows software and data to be transferred between client device 110 and external devices such as, for example, another client device 110, a computer 34, 54 and other devices that may be locally or remotely connected to system 100. Examples of the one or more communication interfaces 169 may include, but are not limited to, a modem, a network interface (such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short range communication, such as near field communication ("NFC"), Bluetooth, or other interface for communication via another wireless communication protocol. As briefly noted above, one of ordinary skill in the art will understand that computers 34, 54 and portions of system 100 may include some or all components of client device 110.

Software and data transferred via the one or more communications interfaces 169 are in the form of signals, which may be electronic, electromagnetic, optical, or other signals capable of being received by communications interfaces 169. These signals are provided to communications interface 169 via a communications path or channel. The channel may be implemented using wire or cable, fiber optics, a telephone line, a cellular link, a radio frequency ("RF") link, or other communication channels.

In this document, the terms "non-transitory computer program medium" and "non-transitory computer readable medium" refer to media such as removable storage units 116, 118, or a hard disk installed in hard disk drive 112. These computer program products provide software to client device 110. Computer programs (also referred to as "computer control logic") may be stored in main memory 108 and/or secondary memory 110. Computer programs may also be received via the one or more communications interfaces 169. Such computer programs, when executed by a processor(s) 102, enable the client device 110 to perform the features of the method discussed herein.

Figure 2:
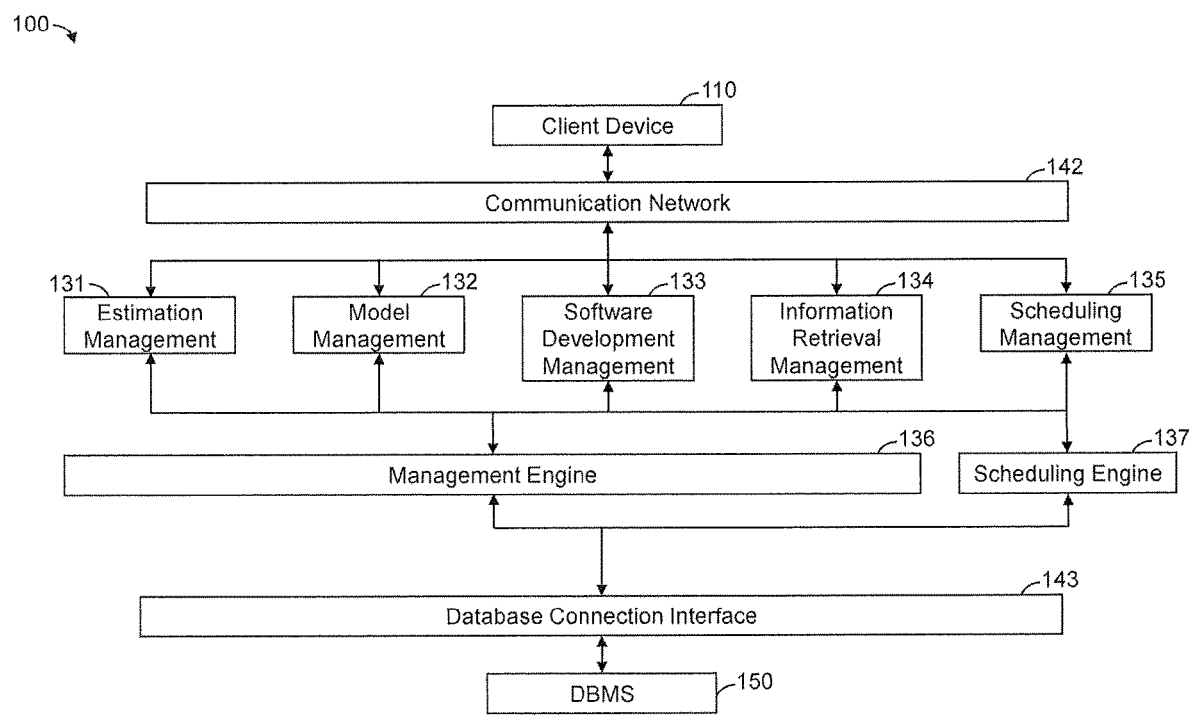
FIG. 2 illustrates one example of management server components in accordance with some embodiments of the present disclosure.

FIG. 2 is a diagram of system 100 management server 130 components in accordance with some embodiments of the present disclosure. System 100 may be a computing environment including one or more client devices 110, management server 130, one or more software management modules 131, 132, 133, 134, and 135, one or more software engines 136 and 137, database connection interface 143, database management system 150, and a communication network 142 connecting various components of system 100. Although one client device 110 is shown in FIG. 2, any number of client devices may be present. In various embodiments, client device 110 is a user device capable of connecting to the Internet or similar network as will be described below. In some embodiments, at least one device is a planner client device 110-1 and a client user (e.g., person inputting information utilized for estimation) client device 110-2.

In various embodiments, as shown in FIGS. 1A-1B and 2, client device 110 may include a computing device such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), or any other suitable computing device configured to store data and software instructions, execute software instructions to perform operations, and/or display information on a display device. Client device 110 may be associated with one or more users (not shown). For example, a user operates client device 110, causing it to perform one or more operations in accordance with various embodiments.

Client device 110 includes one or more tangible, non-transitory memories that store data and/or software instructions, and one or more processors configured to execute software instructions. Client device 110 may include one or more display devices that display information to a user and one or more input devices (e.g., keypad, keyboard, touch-screen, voice activated control technologies, or any other suitable type of known input device) to allow the user to input information to the client device. Client device 110 processor(s) may be any central processing unit ("CPU"), microprocessor, micro-controller, or computational device or circuit for executing instructions. Processor(s) are connected to a communication infrastructure (e.g., a communications bus, cross-over bar, or network). Various software embodiments are described in terms of this exemplary client device 110. After reading this description, it will be apparent to one of ordinary skill in the art how to implement the method using client device 110 that include other systems or architectures. One of ordinary skill in the art will understand that computers may have a similar and/or identical architecture as that of client device 110. Put another way, computers can include some, all, or additional functional components as those of the client device 110 illustrated in FIGS. 1A-1B and 2.

Client device 110 also includes one or more communication interfaces 169, which allows software and data to be transferred between client device 110 and external devices such as, for example, another client device 110, a computer, management server 130, and other devices that may be locally or remotely connected to client device 110. Examples of the one or more communication interfaces may include, but are not limited to, a modem, a network interface (e.g., communication interface 169, such as an Ethernet card or wireless card), a communications port, a Personal Computer Memory Card International Association ("PCMCIA") slot and card, one or more Personal Component Interconnect ("PCI") Express slot and cards, or any combination thereof. The one or more communication interfaces 169 may also include a wireless interface configured for short range communication, such as near field communication ("NFC"), Bluetooth, or other interface for communication via another wireless communication protocol.

Software and data transferred via the one or more communications interfaces 169 are in the form of signals, which may be electronic, electromagnetic, optical, or other signals capable of being received by communications interfaces. These signals are provided to communications interface 169 via a communications path or channel. The channel may be implemented using wire or cable, fiber optics, a telephone line, a cellular link, a radio frequency ("RF") link, or other communication channels.

In an embodiment where the system 100 or method is partially or entirely implemented using software, the software may be stored in a computer program product and loaded into client device 110 using removable storage drive, hard drive, and/or communications interface. The software, when executed by processor(s), causes the processor(s) to perform the functions of the method described herein. In another embodiment, the method is implemented primarily in hardware using, for example, hardware components such as application specific integrated circuits ("ASICs"). Implementation of the hardware state machine so as to perform the functions described herein will be understood by persons skilled in the art. In yet another embodiment, the method is implemented using a combination of both hardware and software.

Embodiments of the subject matter described in this specification can be implemented in a system 100 that includes a back end component, e.g., as a data server, or that includes a middleware component, e.g., an application server, or that includes a front end component (e.g., a client device 110) having a graphical user interface or a Web browser through which a user can interact with an implementation of the subject matter described is this specification, or any combination of one or more such back end, middleware, or front end components. The components of the system can be interconnected by any form or medium of digital data communication, (e.g., a communication network 142). Communications network 142 may include one or more communication networks or media of digital data communication. Examples of communication network 142 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet and combinations thereof. In accordance with various embodiments of the present disclosure, communications network 142 may include the Internet and any publicly accessible network or networks interconnected via one or more communication protocols, including, but not limited to, hypertext transfer protocol (HTTP) and HyperText Transfer Protocol Secured (HTTPS) and Secured Socket Layer/Transport Layer Security (SSL/TLS) and transmission control protocol/internet protocol (TCP/IP). Communications protocols in accordance with various embodiments also include protocols facilitating data transfer using radio frequency identification (RFID) communications and/or NFC. Moreover, communications network 142 may also include one or more mobile device networks, such as a GSM or LTE network or a PCS network, allowing a client device to send and receive data via applicable communications protocols, including those described herein. For ease of illustration, communication network 142 is shown as an extension of management server 130.

A client device 110 and server 130 are generally remote from each other and typically interact through a communication network 142. The relationship of client device 110 and management server 130 arises by virtue of computer programs running on the respective system components and having a client-server relationship to each other. System 100 may include a web/application server (not shown) in embodiments used to gain access to many services provided by management server 130.

In one aspect, client device 110 stores in memory one or more software applications that run on the client device and are executed by the one or more processors. In some instances, each client device stores software applications that, when executed by one or more processors, perform operations that establish communications with management server 130 (e.g., across communication network 142 via communication interface 169) and that obtain, from management server 130, information or data via database management system 150 in accordance with various embodiments.

In various embodiments, client device 110 may execute stored software application(s) to interact with management server 130 via a network connection. The executed software applications may cause client device 110 to communicate information (e.g., estimation of software size, software development effort, software development schedule, techniques, development constraints, etc.). As described below, executed software applications (s) may be configured to allow a user associated with client device 110 to initiate an estimation for project or software development, receive and identify associated estimation/labor costs, and provide feedback associated with the labor costs for specific tasks associated with the project/development. Stored software application(s) on client device 110 are configured to access webpages on the Internet or other suitable network based communication capable of interacting with communication network 142, as would be understood by one of ordinary skill in the art. For example, a user may access a user account on management server 130 via an Internet webpage. In this example, management server 130 is configured to render the Internet webpage for the user on client device 110. Alternatively, management server 130 may provide information to stored software application(s) on client device 110 via communication network 142. In this example, client device 110 will display information provided by management server 130 using a stored software application(s) graphical user interface display. In the example above, a respective user account may be associated with a developer, client user, or supervisor/monitoring authority as would be understood by one of ordinary skill in the art and described below.

According to various embodiments, system 100 includes database management system/storage 150 for managing and storing data, such as design patterns associated with a specific task, environmental factors (e.g., experience, deadline, constraints, etc.), software development and project parameters, and other data maintained by the management server 130. The database management system and/or storage are referred to herein simply as DBMS 150 for convenience. DBMS 150 is communicatively coupled with various modules and engines as illustrated in FIGS. 1A-1B and 2.

It should be understood that various forms of data storage or repositories can be used in system 100 that may be accessed by a computing system, such as hard drives, tape drives, flash memory, random-access memory, read-only memory, EEPROM storage, in-memory databases like SAP HANA, and so on, as well as any combination thereof. Stored data may be formatted within data stores in one or more formats, such as flat text file storage, relational databases, non-relational databases, XML, comma-separated values, Microsoft Excel files, or any other format known to those of ordinary skill in the art, as well as any combination thereof as is appropriate for the particular use. Data stores may provide various forms of access to the stored data, such as by file system access, network access, a SQL protocol (e.g. ODBC), HTTP, FTP, NES, CIFS, and so on, as well as any combination thereof.

According to various embodiments, client device 110 is configured to access DBMS 150 via management server 130. In various embodiments, DMBS 150 is configured to maintain a database schema. As will be described in further detail below, database schema 180 is configured to maintain a plurality of identifiers associated with specific categories of records. For example, database schema may be arranged to maintain identifiers in columns within DBMS 150 associated with design pattern statistics, development costs, development effort, development schedules, estimation model records, and other estimation parameters. In this aspect, identifiers refer to specific information pertaining to the categories described above. Database schema 180 within DMBS 150 may be arranged or organized in any suitable manner within the system. Although the above described examples identify categorical identifiers, any number of suitable identifiers may be used to maintain records associated with the system described herein. In addition, a database schema may contain additional categories and identifiers not described above for maintaining record data in system 100. The database can also provide the information of performance evaluation for financial advisors.

The database schema described above advantageously organizes identifiers in a way that permits the system to operate more efficiently. In some embodiments, categories of identifiers in the database schema increase efficiency by grouping identifiers with an associated management model of management server 130.

In various embodiments, management server 130 includes computing components configured to store, maintain, and generate data and software instructions. For example, management server 130 may include or have access to one or more processors 24, one or more servers (not shown) and tangible, non-transitory memory devices (e.g., local data store (in addition to DBMS 150)) for storing software or code for execution and/or additional data stores. Servers may include one or more computing devices configured to execute software instructions stored on to perform one or more processes in accordance with various embodiments. In some embodiments, DBMS 150 includes a server that executes software instructions to perform operations that provide information to at least one other component of computing environment 100, for example providing data to another data store or to third party recipients (e.g., third party vendors, information gathering institutions, etc.) through a network, such as a communication network 142.

Management server 130 may be configured to provide one or more websites, digital portals, or any other suitable service that is configured to perform various functions of management server 130 components. In some embodiments, management server 130 maintains application programming interfaces (APIs) through which the functionality and services provided by server 130 may be accessed through one or more application programs executed by a client device 110. Exemplary services and systems provided by management server 130 include estimation management 131, model management 132, software development management 133, information retrieval management 134, and scheduling management 135, each of which is described in further detail below. In various embodiments, management server 130 may provide information to software application(s) on client device 110 for display on a graphical user interface 168.

In some embodiments, management server 130 provides information to client device 110 (e.g., through the API associated with the executed application program). Client device 110 presents portions of the information to corresponding users through a corresponding respective graphical user interface 168 or webpage.

In various embodiments, management server 130 is configured to provide or receive information associated with services provided by management server 130 to client device 110. For example, client device 110 may receive information via communication network 142, and store portions of the information in a locally accessible store device and/or network-accessible storage devices and data stores (e.g., cloud-based storage). For example, client device 110 executes stored instructions (e.g., an application program, a web browser, and/or a mobile application) to process portions of stored data and render portions of the stored data for presentation to the respective user or users. Management server 130 may include additional servers (not shown) which may be incorporated as a corresponding node in a distributed network or as a corresponding networked server in a cloud-computing environment. Furthermore, servers may communicate via communication network 142 with one or more additional servers (not shown), that may facilitate the distribution of processes for parallel execution by the additional servers.

In further aspects, management server 130 may represent a "controlling entity" capable of storing, managing, distributing, and safeguarding information (e.g., estimation models, development costs, project management efficiency, etc.) in accordance with various embodiments.

Estimation Process Management

Figure 3:
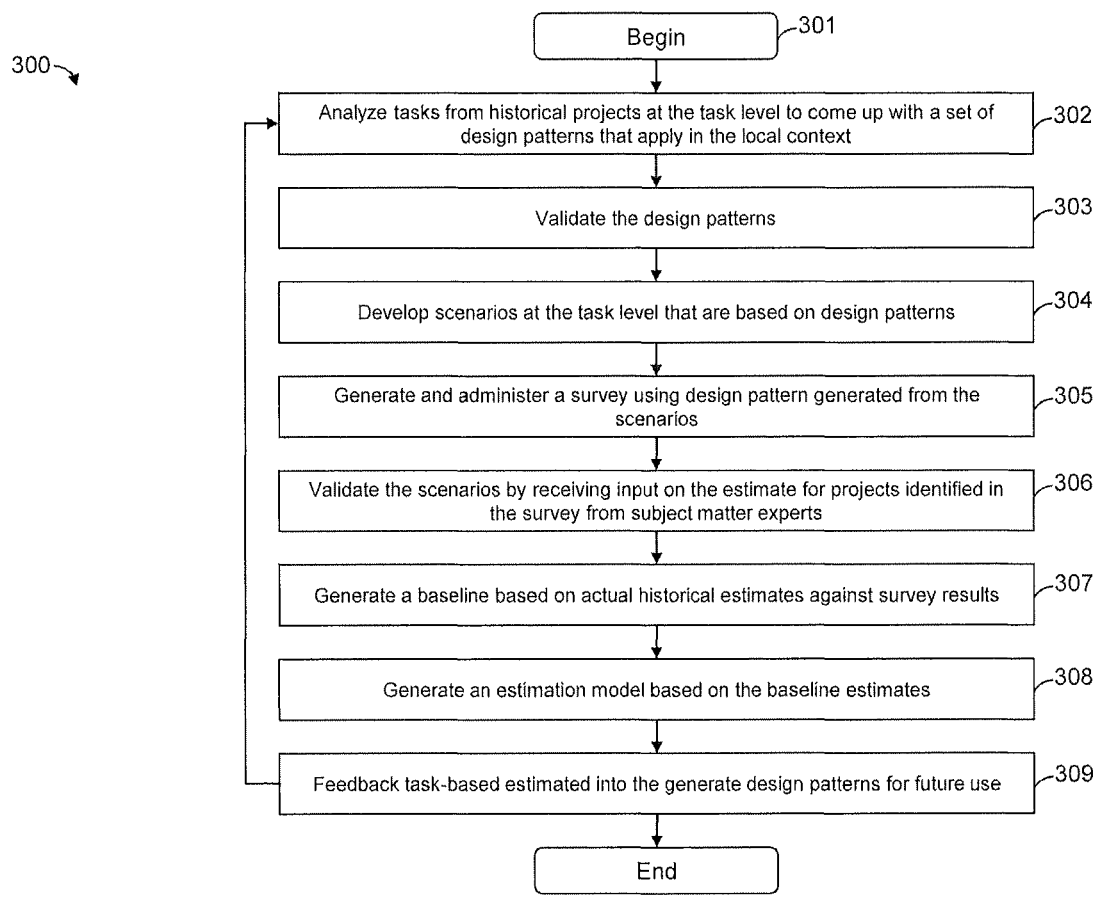
FIG. 3 is a simplified flow diagram illustrating an example estimation process in accordance with some embodiments of the present disclosure.

FIG. 3 is a flow diagram illustrating an example estimation process 300 in accordance with some embodiments of the present disclosure. The process 300 provides for the generation and update of an estimation based on actual tasked based design patterns. At step 302, the system analyzes historical projects at the task level and generates a set of design patterns that apply to an organization's local context. At step 303, the design patterns are validated. In some embodiments, the design patterns are validated against historical patterns for accuracy. In some embodiments, the design patterns are validated with subject matter experts at the company through interviews. In various embodiments, the validation step is optional and the design patterns are identified without validation. At step 304, the design patterns are decomposed into tasks and scenarios are generated based on the task level associated with the decomposed design patterns. At step 305 a project or software development survey is generated utilizing the tasks associated with the scenarios from step 304. At step 306, the scenarios are validated as a function of input received from subject matter experts regarding the estimate for projects identified in the survey at step 305. At step 307, a baseline estimate is generate based on actual past estimates and survey results information identified at step 306. At step 308, an estimation model is generated based on the base line estimates for the tasks associated with the project. At step 309, feedback is incorporated in the task-based estimates to update the local context design patterns for future projects.

Advantageously, the present disclosure generates a Mixed Integer Linear Programming (MILP) model that will take into consideration varied skills and domain expertise of resources. Moreover, the concepts of differentiated skill sets and domain expertise improve the overall efficiency of a team over time and include possible economies of scale in the management of the resource pool.

Figure 4:
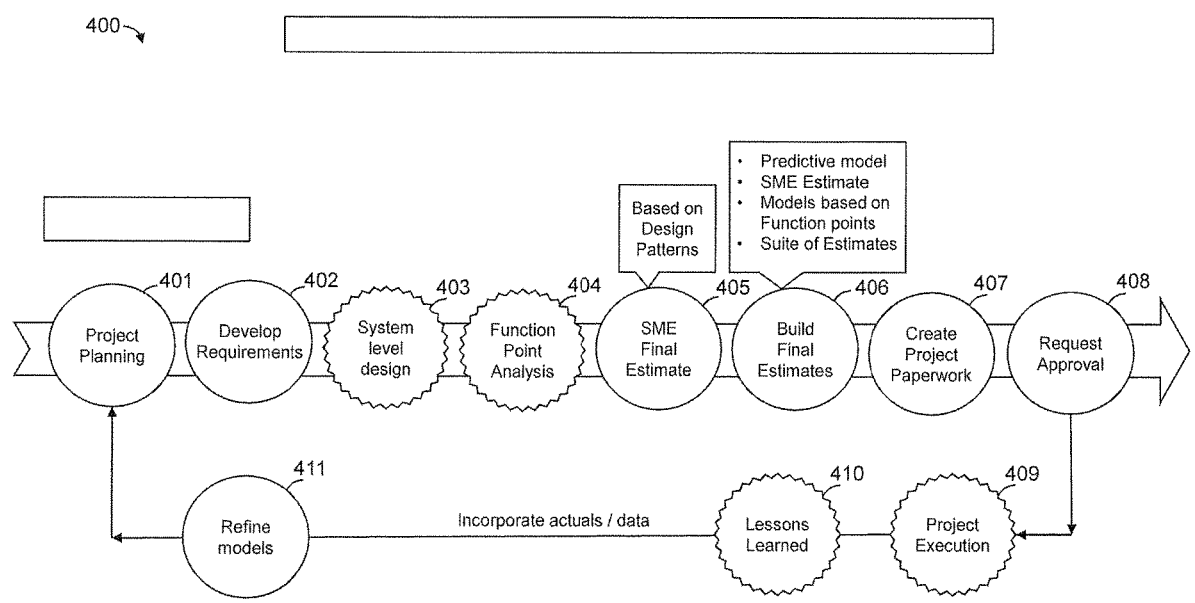
FIG. 4 is a simplified flow diagram illustrating an example for generating an estimation process in accordance with some embodiments of the present disclosure.

FIG. 4 is flow diagram illustrating an example for generating an estimation process 400 in accordance with some embodiments of the present invention. At the outset, an idea for a project is considered and is taken through design sprints. A sprint is a time window during which development takes place. The product owner or the business sponsor champions the project and requirements for the application are put together as a collection of stories into software like JIRA. JIRA is one of the more popular software that is used by organizations to organize sprints. In an optimization model for sprint planning in an agile environment, stories may be assigned to each sprint. The stories are prioritized in order of importance. Each story is assigned story points when entered into the system. Usually the higher the story points, the more effort involved in implementing the story. The collection of stories can be referred to as a backlog of items.

When the project team plans a sprint, they pick the highest prioritized stories from the backlog. The backlog can be viewed as the list of pending stories that need to be completed to deliver the functionality. When stories are prioritized, they can be classified as must have, should have and nice to have. The entire software release will consist of a sequence of sprints. Long-term planning takes place at the release level. Short term planning takes place at the sprint level.

Traditional software teams give estimates in a time format: days, weeks, months. Many agile teams, however, have transitioned to story points. Story points rate the relative effort of work in a Fibonacci-like format: 0, 0.5, 1, 2, 3, 5, 8, 13, 20, 40, 100. Reasons to use story points vs. time based estimates include: (1) Dates do not account for non-project related work; (2) Dates may have non-related attachments to them (i.e., emotions); (3) Each team will estimate work on a slightly different scale, which means their velocity (measured in points) will naturally be different; (4) Once you agree on the relative effort of each story point value, you can assign points quickly; and (5) Story points reward team members for solving problems based on difficulty, not time spent. Teams starting out with story points use an exercise called planning poker. The planning poker is mentally formulating an estimate.

According to various embodiments, for any given estimation model generation the following data and variables are considered:
R: Set of potential projects to be completed during the planning horizon
$M^r$: Maximum number of sprints allowed per project from the start date to complete the project (introduced to account for end date constraint) for $r \in R$
S: Set of all stories across all projects
$S^r$: Set of stories belonging to project $r \in R$
T: Set of all sprints taking into consideration the planning horizon
K: Set of all skills
$K^s$: Set of skills required by story $s \in S$
I: Set of individuals available to be assigned to work on stories
E: Set of Subject Matter Experts $E \subset I$
$\Pi_{sr}$: value (in $) of story $s \in S$ in project $r \in R$
$ROI^r$: ROI (in $) of a project $$\Pi_{sr} = ROI^r * \frac{\text{Nominal time of story } s}{\text{Total Time for all stories in project } r}$$

The nominal time refers to the estimated time for story s in this context. An ROI is given at the project level. The value of a story in a project is calculated by the contribution of a single story in terms of its estimate as a percentage contribution of the total estimate for all stories in a project. For example, for two stories $s_1$ and $s_2$ in project $r_1$.
$p_1$ is the nominal processing time for story $s_1$ and is estimated to take 40 hours.
$p_2$ is the nominal processing time for story $s_2$ and is estimated to take 80 hours.
$p_3$ is the nominal processing time for story $s_3$ and is estimated to take 80 hours.

Assume the ROI of the Project 1 is $47,469, and the total estimated time for all stories in project 1 is 540 hours
The value of Story 1: $47469*(40/540)=$3516
The value of Story 2: $47469*(80/540)=$7032
The value of Story 3: $47469*(80/540)=$7032
$W_{it}$: Workload of individual $i \in I$ in sprint $t \in T$
$P_s$: The nominal processing time of story $s \in S$
$P_{sk}$: The nominal processing time for skill $k \in K$ in story $s \in S$ The nominal time above refers to the estimated time for a story and the estimated time for a skill in the story. For example, a story that has an estimate of 40 hours. This story is comprised of four skills S1, S2, S3, and S12. The individual estimate to complete those skills is S1(4 hours), S2(20 hours), S3(2 hours) and S12(14 hours).
$\theta_{ik}$: Efficiency score of individual $i \in I$ to work on skill $k \in K$ The efficiency score of an individual for a skill is computed based on the following factors:
1. Total experience of an individual in a skill.
2. The date when the skill was last employed by an individual.
3. The self-rating for the skill by the individual.
4. Rating of the individual on the skill by the SME or by all the other team members This research applies a weighted score based on the above factors. A higher efficiency score means the individual is better suited for the skill, whereas a lower score close to zero means the individual is completely incapable for the corresponding skill. The lower bound for an efficiency score is 0.01, and the upper bound for an efficiency score is 1.

$$\frac{P_s}{\theta_{ik}}:$$

Time taken by individual i to complete skill k in story s in hours
$C_i$: Pay Rate per hour of Individual $i \in I$
D: Discounting Factor. A discount factor of 0.01 in the execution of the model for all runs.

For example, if a requirement that stories 1, 2 and 3 must be completed in the same sprint, it would define it as shown below
$S^{AND}$: Set of pairs of stories that must be assigned to the same sprint. It accounts for all stories that have the constraint which must be implemented in the same sprint.

SAND=[{1, 2}, {2, 3}];
For example, the definition below shows a case where stories 1 and 10 have to be executed in different sprints. Similarly, stories 11 and 23 have to be executed in different sprints.
SOR=[{1, 10},{11, 23}];
F: Set of precedent relationships of pairs of stories. For example, when story s need to precede story s', the set {s, s'} must be an element of $S^{AND}$ or F.

There will be a lot of instances where a story needs to be completed before another story. Those precedence relationships will be held in the above mentioned set. For example, when a request for story s is to be assigned to a sprint prior to story s', itt is also assumed that both s and s' will be part of the set $S^{AND}$ set and this will ensure both the stories are assigned to the same sprint as well.

According to some embodiments, the various assumptions are being made. For example, each story has been decomposed into sub-tasks that each require a single skill. For this example, the first assumption is that each sub-task requiring a single skill will be completed in a single sprint. The estimate associated with these sub-tasks is often at or below 40 hours, which is typically the case in real life operations. The second assumption is that all skills/sub-tasks associated with an assigned story are completed in the same sprint. It could often be the case that these sub-tasks can be worked on in parallel, thus this assumption is in-line with what happens in the real world where a story is often decomposed in such a way that it can be completed in one sprint. The time for a single story is 80 hours or less, and this is an assumption that will help avoid carryover stories from sprint to sprint and is in-line with real life operations. It implies that one story including all its sub-tasks can be completed in a single sprint. The final assumption is that all projects can start at the same time. There is a constraint to enforce the deadline by which a project must be completed. This constraint ensures that all the stories with its associated sub-tasks/skills are available to be allocated to resources.

The overall objective is to maximize the total net utility of an estimate. The total net return is calculated as the difference between the total discounted return and the total staffing cost. The cost was not discounted in the objective function with the assumption that the staffing cost can be treated as sunk cost for the internal employees. The objective function can be easily revised to discount cost if needed. Maximize the total net return: Total discounted return—Total cost. An example of an objective function according to various embodiments is identified here:

$$\sum_{t \in T} \sum_{r \in R} \sum_{s \in S} \frac{(\Pi_{sr} * Y_{st})}{(1+D)^t} - \sum_{i \in I} \sum_{t \in T} \sum_{s \in S} \sum_{k \in K} C_i * \left( X_{itsk} * \frac{P_{sk}}{\theta_{ik}} \right)$$

When discussing constraints of the estimation model, the constraint ensures that each story is assigned to at most one sprint. An example of the constraint is identified below. An assumption is made for this constraint such that all skills will be performed in the same sprint and this constraint will ensure that each story is assigned to at most one single sprint and will be completed in that sprint.

$$\sum_{t \in T} Y_{st} \le 1 \forall s \in S$$

The constraint below ensures each skill is performed by exactly one individual for each story assigned to a sprint. This also results in the derived decision variable $Y_{st}$ being computed as a function of the main decision variable $X_{itsk}$. Here, each skill each skill will be performed by one individual resource for each story.

$$\sum_{i \in I} X_{itsk} = Y_{st} \forall s \in S, k \in K^s, t \in T$$

An additional constraint according to various embodiments is to meet the requirements that the workload of each individual cannot be exceeded. The workload is given by $W_{it}$, which is the workload of individual $i \in I$ in sprint $t \in T$. The constraint below ensures that every story s and every skill k that is needed to complete the story s, the total time spent by individual i to work on the story is less than the workload of individual i.

$$\sum_{s \in S} \sum_{k \in K^s} \left( X_{itsk} * \frac{P_{sk}}{\theta_{ik}} \right) \le W_{it} \ \forall t \in T, i \in I$$

Some stories must be implemented in a sprint. In some embodiments, the scenario where a collection of stories must be completed in the same sprint. For example, a collection $S^{AND}$ contains these set of stories. These set of stories will mostly be from the same project, but it is quite possible that these stories could be spread across multiple projects as well. For example, according to various embodiments, stories that require the same type of skill in two projects could group together these set of stories.

$$\sum_{s \in \gamma} Y_{st} = |\gamma| \forall t \in T, \gamma \in S^{AND}$$

$$\sum_{t \in T} Y_{st} * t = \sum_{t \in T} Y_{s't} * t \ \forall s, s' \in \gamma, s > s'$$

In various embodiments, only one story from $S^{OR}$ can be implemented in a sprint. $S^{OR}$ contains the stories that are incompatible with each other. The constraint below ensures that at most only story from the set $S^{OR}$ will be done in a single sprint.

$$\sum_{s \in \gamma} Y_{st} \le 1 \ \forall \gamma \in S^{OR}, t \in T$$

In some embodiments, dependency constraints are included where story s needs to be completed before story s'. These set of stories are contained in the set F. The constraint below ensures story s is completed before story s' in the same sprint. The constraint ensures that both s and s' are assigned to the same sprint as well.

$$\sum_{t \in T} Y_{st} * t \le \sum_{t \in T} Y_{s't} * t \ \forall (s, s') \in F$$

In various embodiments, there is a need to implement the constraint for end date of the project. A new input variable M$^r$, could be used for the maximum number of sprints allowed per project from the start date to complete the project for each project r∈R. For example, if a project's end date is two months out, M$^r$ would have a value of three assuming each sprint is three weeks long. Similarly, if the project's end date is one month out, M$^r$ would have a value of two. The constraint below ensures all stories s$^r$ belonging to a particular project r will be completed before the end of M$^r$ which is the maximum number of sprints allowed to complete the projects. This ensures the end date constraint for each project is met.

$$\sum_{t \in T} Y_{st} * t \leq M^r \; \forall \, s \in s^r$$

In some embodiments, the constraint below assigns at least one subject matter expert (SME) for a project. For any given project, there may be requirements that need at least one SME to be assigned to each project. For a set of SMEs' E which is a subset of the set of resources I, the constraint below ensures one SME is assigned to every project.

$$\sum_{i \in E} \sum_{t \in T} \sum_{s \in S^r} \sum_{k \in K} X_{itsk} \geq 1 \; \forall \, r \in R$$

Referring back to FIG. 4, at 401 every project starts off with a planning phase. At 402, the definition of requirements for the project are identified according to the business are for the project. At 403, a system level design is generated by the technical team. At 404, the function point analysis is completed and at this time you have enough information to create a bottom-up estimate using the new estimating tool. At 405, the subject matter experts come up with a system design and translate the design into high level tasks that are then input into the estimating tool. In some embodiments, there are multiple subject matter experts involved in a project and each of them estimate a separate feature of the project. At 406, the SME's start on the "Cost Projection Form" tab and set up basic demographic information about the project. At 407, the SME's move onto the "Design and Development Estimates" tab to enter the task level estimate. The following fields are required for each task:
a. Activity Type: Indicates if the task is a design or a development task.
b. Task Category: This indicates the high-level design pattern to which the task belongs. Some of the options include Open System Controller, Open Systems Model and View, Document Processing, Mobile, etc.
c. Create/Modify: This indicates whether the task involves creating a new artifact or modifying an existing artifact.
d. Task Type: The values in this dropdown are derived directly from the design patterns that were generated. The values in the dropdown are populated based on the entries for the previous three fields.
e. Task Complexity: The options for this field are high, medium and low.
f. Task Description: This is the description for the task that is used in the time tracking system.

Once the data entered for the above mentioned six fields, a recommended estimate is generated and this estimate initially is based on the baseline for each task that was generated using the survey results and discussion with the enterprise architects at the organization. At 408, during the approval process the following fields can be inputted to adjust the overall estimate:
a. Recommended Estimate: This field is automatically populated when the above mentioned six fields are entered or chosen.
b. Override Estimate: The SME can choose to override the estimate at the task level and when they do so, the override value takes effect for the task.
c. Override Comments: The SME is required to enter comments when a task is overridden.
d. Estimate Component: This field is used to breakdown the cost by features.
e. Requirement: Some project managers like to track the project by requirements and this field gives the capability to enter the requirement number related to the task.
f. Owner: This field indicates the name of the SME doing the estimate and is considered the owner of the task.

FIG. 5 is an illustration of the overall cost for the project in accordance with some embodiments of the present invention. According to various embodiments, FIG. 5 is an example interface identifying the cost projection table for the estimating tool system 100. In some embodiments, an interface is provided and configured to maintain a running total of the overall costs for the project. As shown in FIG. 5, the top of the design and development estimates tab illustrated. In reference to FIG. 5, when a task is entered, each activities (i.e., project planning, design, development/configuration, etc.) respective hours and costs are updated. As depicted in FIG. 5, according to various embodiments, at any given point of time from when tasks are entered, an interface is provided to compare the design pattern estimates against the subject matter expert estimates and recommended cost.

According to various embodiments, at any given point of time, a comparison of the SME estimate (this includes the overridden cost for each task) and the recommended cost (this does not include the overrides) can be generated. There are times when a task does not fit into one of the design patterns. In this case, there is always the option to "enter a new task" and manually put in the estimate for that task. When there are multiple application development teams requesting for a new task that is similar, the task is added to the design pattern of the organization and incorporate it into the estimating tool. In some embodiments, the tool also provides the capability to override the verification, implementation and post implementation time in the "Overhead and Summaries" tab. It also provides the capability to enter the project management time, tech lead time and meeting time in the "Overhead and Summaries" tab.

The subject matter expert works with the project manager and other managers in the organization to explain the estimate. The project manager now moves on to the "Estimate Comparative" tab and enters the adjusted function point number. You now have access to six of the seven estimates in the suite of estimates. The first two estimates are directly from the data that is entered in the "Design and Development Estimates" tab. The last four estimates are based off the function point's count.

Referring back to FIG. 4, at 409 and 410, the project is executed and lessons learned are identified. The model is refined at 411 to incorporate for the next project.

FIG. 6 is an illustration of the estimate comparative tab in accordance with some embodiments of the present invention. The EDJ SME/PL Estimate is the estimate of the subject matter/technical lead including the override time chose for all tasks in the design development estimates tab.

The Recommend Cost is the estimate for all the tasks taking into account only the time that the tool recommended and leaving out the override time chosen for the individual tasks.

EDJ Predictive Cost is the predicted cost based on historical data. The historical data can include number of associates, number of contractors, number of experienced contractors, duration of project, number of development tasks, time spent in testing, time spent in planning, technical team doing the project and type of project.

Function Point Baseline is the predicted cost for the project based on historical data in a function point database. It is calculated based on the calculated function points. It may include a creep factor, that adjust the function point number a set amount every month of the project.

COCOMO II Best Case, Average and Costlier provides a range based on the function point count. The best case assumes a high performing team and schedule pressure is relaxed. The average case assumes a nominal team and schedule pressure is normal. The costlier case assumes a nominal team and schedule pressure is high.

The quality of the estimate is continuously evaluated. According to various embodiments, an assessment of the estimate can be determined by understanding which estimate from the suite of estimates came closest to the actual labor cost. In some embodiments, the quality of the assessment will be determined at the individual task level and data can be aggregated to improve design patterns for future modeling.

Advantageously, the optimization model can be implemented using IBM ILOG CPLEX Optimization Studio or similar software. The model can calculate efficiency score for each individual and be implemented across different use cases.

Figure 7:
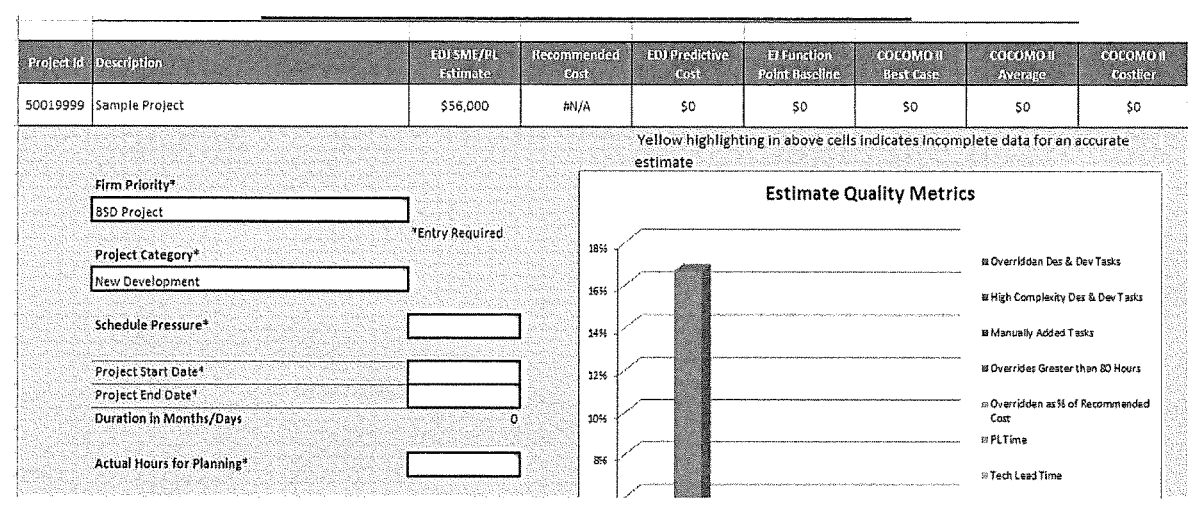

FIG. 7 is an example of an estimate comparison tab in accordance with some embodiments of the present invention. As illustrated in FIG. 7, according to various embodiments, the system 100 is configured to provide an interface for displaying a series of estimates. In the embodiment depicted in FIG. 7, an estimate comparison is provided that identifies a plurality of estimates. For example, the first two estimates are generated from the data entered in the design and development steps described above and identified in FIG. 8 below. The last four estimates are based off the function point's count. In some embodiments, there are other fields that are required to be entered on the estimates comparative tab, and this populates the predictive cost for the organization. This is based on the historical data at the organization.

Figure 8:
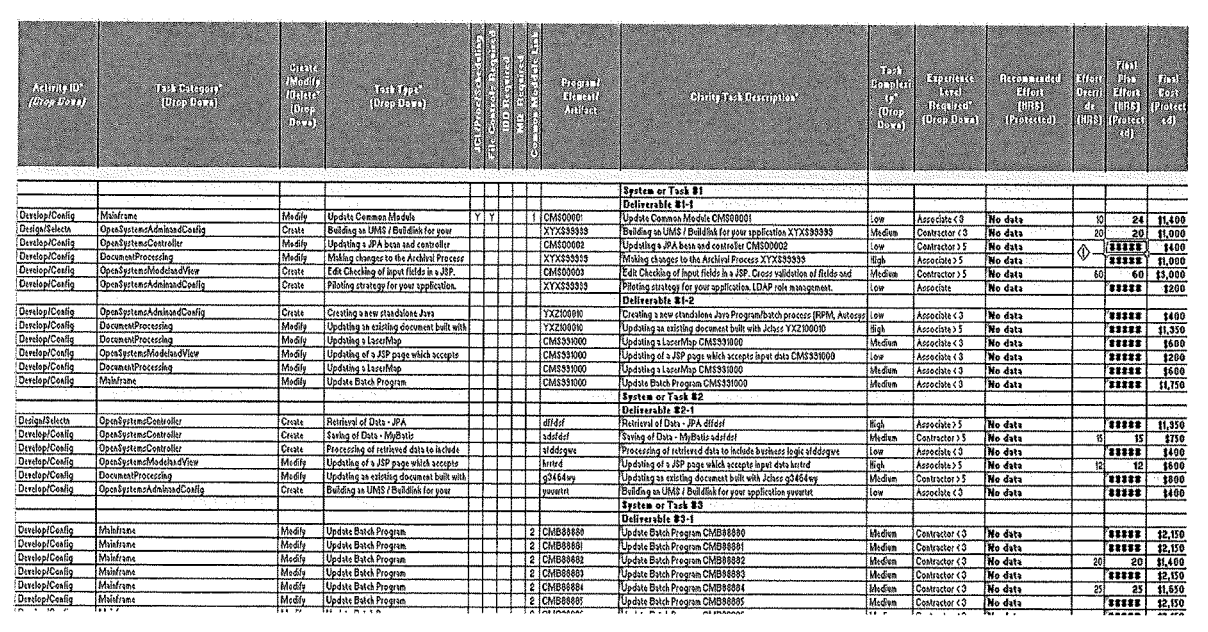

FIG. 8 is an example of a design and development task window entered by the subject matter expert in accordance with some embodiments of the present invention. According to various embodiments, as depicted in FIG. 8, system 100 is configured to provide an interface for inputting parameters associated with the estimation tool described above. By way of example, FIG. 8 permits a user of client device 110 to input information (e.g., project start and end date, project priority and category information, hours for planning, etc.) to generate an estimate and corresponding informational and tracking details for a project.

According to various embodiments, the design patterns are required to be reflected in the system. By way of example, the tool can store various design patterns that may be updated based on actual estimation performance. Moreover, the above described system provides the capability to create a bottom-up estimate that was rooted in the design patterns of the organization. Moreover, the system advantageously has the capability to create a subject matter expert estimate and a recommended estimate. In various embodiments, the subject matter expert estimate also had to form the basis for the predictive model estimate.

In various embodiments, the system may accommodate the capability to enter function points. By way of example, a function is a unit of measurement to express the amount of business functionality an Information system or application provides to a user. In this example, the Construction Cost Model II (COCOMO II) software, a constructive software estimation model based on regression techniques and empirical studies, may take function points as input to estimate the cost, effort, and schedule associated with a software development project. In some embodiments, the present disclosure permits the function point count to form the basis for the estimates provided by the system.

According to some embodiments, the system provides estimates as part of an estimate comparative tool or feature. Advantageously, this permits the capability to combine executive judgement with data science. In various embodiments, the system has the capability to partition the overall cost by high-level features and requirements. In some embodiments, the system has the capability to upload the final estimate to the time booking system for tracking purposes. By way of example, individuals time trackers and/or calendars may be updated according to the estimate provided by the system.

In some embodiments, the system has the capability of producing a running total each time as task is added. In various embodiments, the system may keep track of time by each phase of the project and compare it to historical averages for the organization and each individual area.

In some embodiments, the system may allow the subject matter expert to override the recommendation cost. In some embodiments, the system has the capability to account for project management time and tech lead contingency time and meeting time. This time had to be allocated across phases based on the input of the project manager.

According to various embodiments, the estimates dynamically generate and/or populate on the interface of the estimation tool based on different values and/or inputs that affect any of the variables or options identified above.

The present disclosure can be embodied in the form of methods and apparatus for practicing those methods. The present disclosure can also be embodied in the form of program code embodied in tangible media, such as secure digital ("SD") cards, USB flash drives, diskettes, CD-ROMs, DVD-ROMs, Blu-ray disks, hard drives, or any other non-transitory machine-readable storage medium, wherein, when the program code is loaded into and executed by a machine, such as a computer, the machine becomes an apparatus for practicing the disclosure. The present disclosure can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

It may be emphasized that the above-described embodiments, are merely possible examples of implementations, and merely set forth a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

While this specification contains many specifics, these should not be construed as limitations on the scope of any disclosure or of what may be claimed, but rather as descriptions of features that may be specific to particular embodiments of particular disclosures. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

While various embodiments have been described, it is to be understood that the embodiments described are illustrative only and that the scope of the subject matter is to be accorded a full range of equivalents, many variations and modifications naturally occurring to those of skill in the art from a perusal hereof.

What is claimed is:

1. A non-transitory computer readable medium having computer-executable instructions embodied thereon, wherein, when executed by a processor, the computer-executable instructions cause the processor to:
provide a graphical user interface to each of a plurality of display devices, wherein each of the plurality of display devices is configured to display the graphical user interface, and wherein the graphical user interface comprises a plurality of input fields that request input information on one or more of: project start date, project end date, project priority, project category, and hours for planning;
generate design patterns of a local context associated with a software development project based on historical information at a task level, the local context associated with a specific organization;
validate the design patterns of the local context;
decompose the design patterns of the local context into scenarios having a plurality of tasks;
survey the scenarios;
develop a plurality of estimate baselines for the scenarios based on past actual estimates and survey information;
develop an estimation model based on the generated design patterns of the local context and the plurality of estimate baselines for the scenarios;
update the historical information used to generate the design patterns of the local context of the estimation model based on a machine learning algorithm incorporating actual task based performance metrics used in generating design patterns for one or more future projects;
generate updated design patterns of the local context associated with a subsequent software development project, based on the updated historical information.

2. The non-transitory computer readable medium of claim 1, wherein the task is a software design or development task.

3. The non-transitory computer readable medium of claim 2, wherein the task is associated with a category and the design pattern generated corresponds to the task category.

4. The non-transitory computer readable medium of claim 1, wherein the design patterns generated are selected from previously stored design patterns.

5. The non-transitory computer readable medium of claim 4, wherein the identification of previously stored design patterns available for selection are identified based on the activity type and task category.

6. The non-transitory computer readable medium of claim 1, wherein the survey identifies task complexity, design hours, and/or development testing hours.

7. The non-transitory computer readable medium of claim 1, wherein the computer-executable instructions further cause the processor to override the estimate at the task level.

8. The non-transitory computer readable medium of claim 1, wherein the estimation model output comprises a plurality of activities and associated hours and costs of each respective activity.

9. The non-transitory computer readable medium of claim 1, wherein the computer-executable instructions further cause the processor to provide a comparable estimate having a plurality of different estimates based on different estimate models.

10. A method for a task-based approach to the generation of a project estimation, comprising:
providing a graphical user interface to each of a plurality of display devices, wherein each of the plurality of display devices is configured to display the graphical user interface, and wherein the graphical user interface comprises a plurality of input fields that request input information on one or more of: project start date, project end date, project priority, project category, and hours for planning;
generating design patterns of a local context associated with a software development project based on historical information at a task level;
validating the design patterns of the local context;
decomposing the generated design patterns of the local context into scenarios having a plurality of tasks;
surveying the scenarios;
developing a plurality of estimate baselines for the scenarios based on past actual estimates and survey information;
developing an estimation model based on the generated design patterns of the local context and the plurality of estimate baselines for the scenarios;
updating the historical information used to generate the design patterns of the local context of the estimation model, based on a machine learning algorithm incorporating actual task based performance metrics compared against the estimation model in order to generate design patterns for one or more future projects;
generating updated design patterns of the local context associated with a subsequent software development project, based on the updated historical information.

11. The method of claim 10, wherein the task is a software design or development project.

12. The method of claim 11, wherein the task is further associated with a category and the design pattern generated corresponds to the task category.

13. The method of claim 10, wherein the design patterns generated are selected from previously stored design patterns.

14. The method of claim 13, wherein the identification of previously stored design patterns available for selection are identified based on activity type and task category.

15. The method of claim 10, wherein the survey identifies task complexity, design hours, and/or development testing hours.

16. The method of claim 10, further comprising overriding the estimate at the task level.

17. The method of claim 10, wherein the model output comprises a plurality of activities and associated hours and costs of each respective activity.

18. The method of claim 10, further comprising providing a comparable estimate having a plurality of different estimates based on different estimate models.

19. A system comprising:
a server comprising a processor configured to:
communicatively couple to a plurality of display devices that are accessible by a user to enable the user to communicate with the server;
provide a graphical user interface to each of the plurality of display devices, wherein each of the plurality of display devices is configured to display the graphical user interface, and wherein the graphical user interface comprises a plurality of input fields that request input information on one or more of: project start date, project end date, project priority, project category, and hours for planning;
receive a request to generate a software project estimate;
generate design patterns of a local context associated with the software project based on historical information at a task level;
validate the design patterns of the local context;
decompose the design patterns of the local context into scenarios having a plurality of tasks;
receive survey information associated with the scenarios;
develop a plurality of estimate baselines for the scenarios based on past actual estimates and the received survey information;
update the historical information used to generate the design patterns of the local context of the estimation model based on a machine learning algorithm incorporating actual task based performance metrics used in generating design patterns for one or more future projects; and
generate updated design patterns of the local context associated with a subsequent software development project, based on the updated historical information.

20. The system of claim 19, wherein the software project task is a software design or development task.

* * * * *